(12) United States Patent
Leleu et al.

(10) Patent No.: US 9,781,017 B2
(45) Date of Patent: Oct. 3, 2017

(54) METHOD FOR MANAGING SERVICES ON A NETWORK

(75) Inventors: Philippe Gerard Augustin Leleu, Gennevilliers (FR); Florian Chazal, Gennevilliers (FR)

(73) Assignee: THALES, Neuilly sur Seine (FR)

( * ) Notice: Subject to any disclaimer, the term of this patent is extended or adjusted under 35 U.S.C. 154(b) by 322 days.

(21) Appl. No.: 13/993,770

(22) PCT Filed: Dec. 21, 2011

(86) PCT No.: PCT/EP2011/073525
§ 371 (c)(1),
(2), (4) Date: Jun. 13, 2013

(87) PCT Pub. No.: WO2012/085040
PCT Pub. Date: Jun. 28, 2012

(65) Prior Publication Data
US 2013/0268648 A1    Oct. 10, 2013

(30) Foreign Application Priority Data
Dec. 21, 2010 (FR) ...................... 10 04999

(51) Int. Cl.
*G06F 15/173* (2006.01)
*H04L 12/24* (2006.01)
(Continued)

(52) U.S. Cl.
CPC ........ *H04L 41/5077* (2013.01); *G06F 9/4856* (2013.01); *G06F 9/505* (2013.01); *G06F 9/5044* (2013.01); *G06F 9/5055* (2013.01); *H04L 63/1433* (2013.01); *H04L 67/325* (2013.01); *H04L 67/34* (2013.01); *H04L 69/40* (2013.01);
(Continued)

(58) Field of Classification Search
CPC ............. H04L 41/5077; H04L 63/0209; H04L 63/1433; H04L 69/40; G06F 9/4856; G06Q 30/0269
See application file for complete search history.

(56) References Cited

U.S. PATENT DOCUMENTS 6,516,337 B1 * 2/2003 Tripp et al. ................. 709/223
7,761,573 B2 * 7/2010 Travostino et al. ......... 709/226
(Continued)

FOREIGN PATENT DOCUMENTS

EP        2028592        2/2009

OTHER PUBLICATIONS

Search Report issued in Int'l App. No. PCT/EP2011/073525 (2012).

*Primary Examiner* — Liangche A Wang
*Assistant Examiner* — Ayele Woldemariam
(74) *Attorney, Agent, or Firm* — Knobbe Martens Olson & Bear LLP

(57) ABSTRACT

The invention relates to a method for managing services on a network, comprising: at least two interconnected computer sites, each of which is capable of implementing at least one service that can be accessed from the network; at least one service implemented on a network site; a capability for transferring a service from an initial site to a separate destination site. Each is associated with security attributes and the method includes transferring at least one service from an initial site to a destination site of the network following a predetermined transfer sequence which depends on the security attributes.

3 Claims, 2 Drawing Sheets

(51) Int. Cl.
    *G06F 9/48*     (2006.01)
    *G06F 9/50*     (2006.01)
    *H04L 29/06*    (2006.01)
    *H04L 29/08*    (2006.01)
    *H04L 29/14*    (2006.01)

(52) U.S. Cl.
    CPC .............. *H04L 67/10* (2013.01); *H04L 67/12* (2013.01); *H04L 69/28* (2013.01)

(56) References Cited

U.S. PATENT DOCUMENTS

| | | | |
|---|---|---|---|
| 7,801,994 B2* | 9/2010 | Kudo | 709/226 |
| 8,335,841 B2* | 12/2012 | Kumbalimutt | H04L 12/4641 709/224 |
| 2008/0288622 A1* | 11/2008 | Gordon | G06F 9/542 709/223 |
| 2009/0055507 A1* | 2/2009 | Oeda | 709/216 |
| 2011/0208839 A1 | 8/2011 | Oeda | |

* cited by examiner

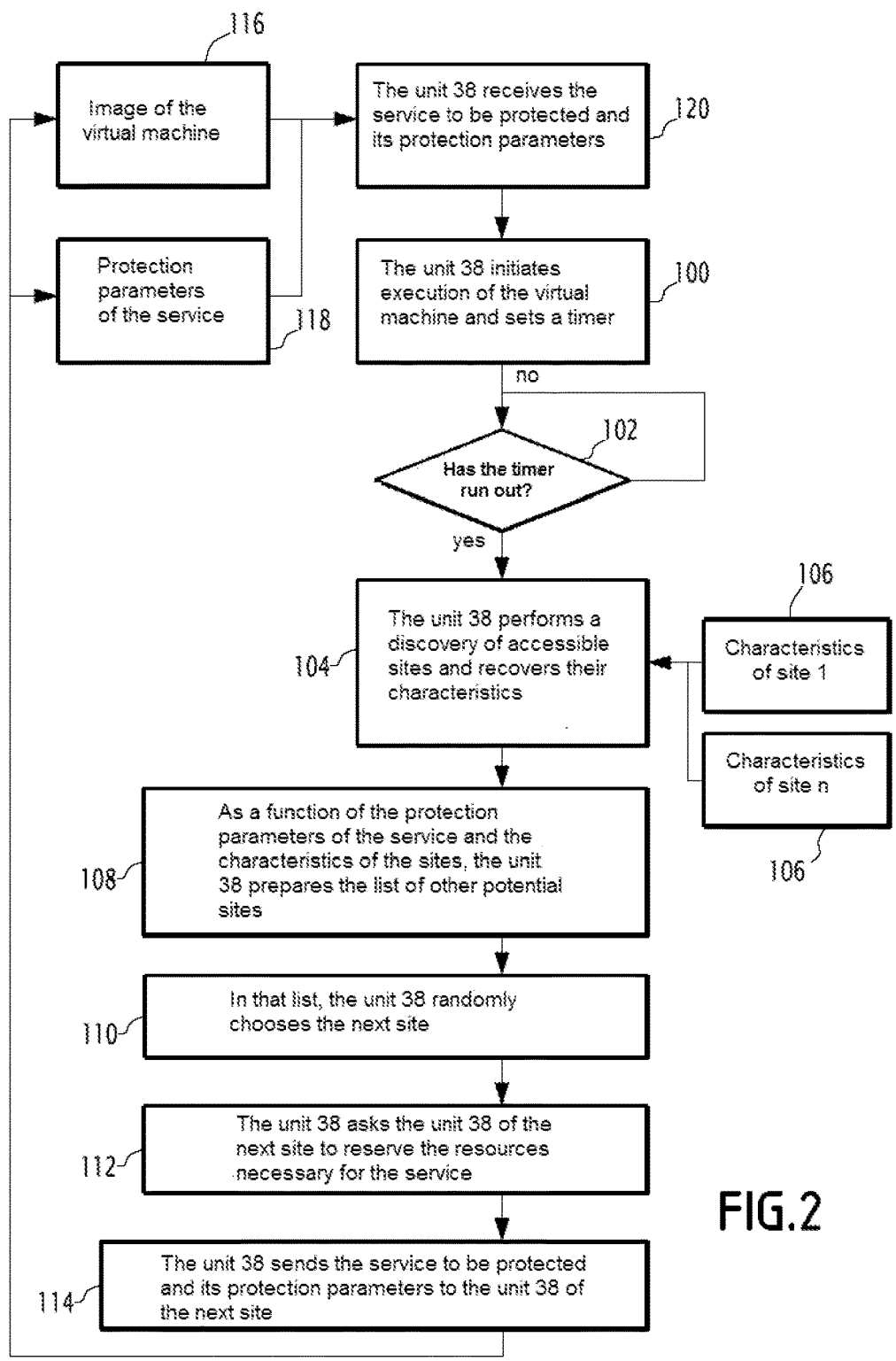

METHOD FOR MANAGING SERVICES ON A NETWORK

This application is a U.S. nationalization under 35 U.S.C. §371 of copending International Application No. PCT/EP2011/073525, filed Dec. 21, 2011, which claims priority to French Patent Application No. 1004999, filed Dec. 21, 2010. The disclosures set forth in the referenced applications are incorporated herein by reference in their entireties

FIELD OF THE DISCLOSURE

The present invention relates to a method for managing services on a network, including:
- at least two interconnected computer sites, each of which is capable of implementing at least one service that can be accessed from the network;
- at least one service implemented on a network site; and
- a means for transferring a service from an initial site to a separate destination site.

BACKGROUND

Large computer networks generally comprise one or more identical or different computer sites each having processing and storage resources. Each site is capable of implementing one or more services offered on the network to all of the sites.

Each site is dedicated to one or more particular services such that, in the event the site is destroyed, for example by a physical or software attack targeting the dedicated site, the services hosted by the attacked site are no longer available on the entire network.

In order to resolve this difficulty, it is known to implement the same service twice on two different sites, thereby ensuring redundancy still making it possible to access the service even if one of the sites is destroyed.

This redundancy must be coupled with preventive maintenance and real-time detection measures, which makes this type of solution particularly costly in terms of infrastructure, personnel, equipment and initial design of the system.

One alternative solution consists of distributing a same service broken down into several parts over several sites, providing for redundancy of each of the parts.

This solution is even more complex and costly than the previous one.

The invention aims to propose a solution for managing services on a network reducing the risks of loss of the service in case of destruction of a network site, having a reduced implementation cost.

SUMMARY

To that end, the invention relates to a method for managing services of the aforementioned type, characterized in that it comprises transferring at least one service from an initial site to a destination site of the network according to a predetermined transfer sequence which depends on the security attributes.

The invention also relates to a method for managing services on a network including:
- at least two interconnected computer sites, each of which can implement at least one service accessible from the network;
- at least one service implemented on a network site;
- a means for transferring a service from an initial site to a separate destination site;

characterized in that each service is associated with security attributes and in that the method includes transferring at least one service from an initial site to a destination site of the network following a predetermined transfer sequence which depends on the security attributes.

According to specific embodiments, the method includes one or more of the following features:
- each service is associated with security attributes and the transfer sequence depends on the security attributes;
- the security attributes include one or more parameters among a criticality level of the service, a minimum transfer frequency, a maximum transfer frequency, an acceptable risk level, and a transfer time range;
- the method includes, for each transfer, a step of choosing the destination site as a function of a predefined rule;
- each site is associated with security characteristics and the step of choosing the destination site includes a step of choosing potential destination sites as a function of the security characteristics of the sites making up the network and a step of choosing the destination site among the potential destination sites;
- the security characteristics include one or more of the characteristics from among the available resources of the site, the physical and logic risk level of the site, and the quality of the network for accessing the site;
- the step of choosing the destination site includes a phase of randomly choosing among the network sites;
- the transfer sequence depends on the security characteristics of the site on which the service is implemented.

The invention also relates to a network, characterized in that each site includes a supervision unit capable of hosting a service on the site and transferring it to another site according to said transfer sequence.

This network includes one or more of the following features:
- at least two interconnected computer sites each capable of implementing a service accessible from the network;
- at least one service implemented on a network sites;
- a means for transferring a service from an initial site to a different separate site;

characterized in that the means for transferring at least one service from an initial site to a destination site of the network is capable of performing the transfer following a predetermined transfer sequence that is independent of the sole responsibility of the or each site implemented by a service management method as previously described.

The invention also relates to a network including:
- at least two interconnected computer sites, each of which is capable of implementing at least one service accessible from the network;
- at least one service implemented on a network site;
- a means for transferring a service from an initial site to a separate destination site;

characterized in that each service is associated with security attributes and in that the means for transferring at least one service from an initial site to a destination site of the network is capable of performing the transfer following a predetermined transfer sequence that depends on the security attributes by implementing a service management method as previously described.

BRIEF DESCRIPTION OF THE DRAWINGS

The invention will be better understood upon reading the following description, provided solely as an example and done in reference to the drawings, in which:

FIG. 2 is a flowchart of the method implemented in the network according to the invention.

DETAILED DESCRIPTION

Figure 1:
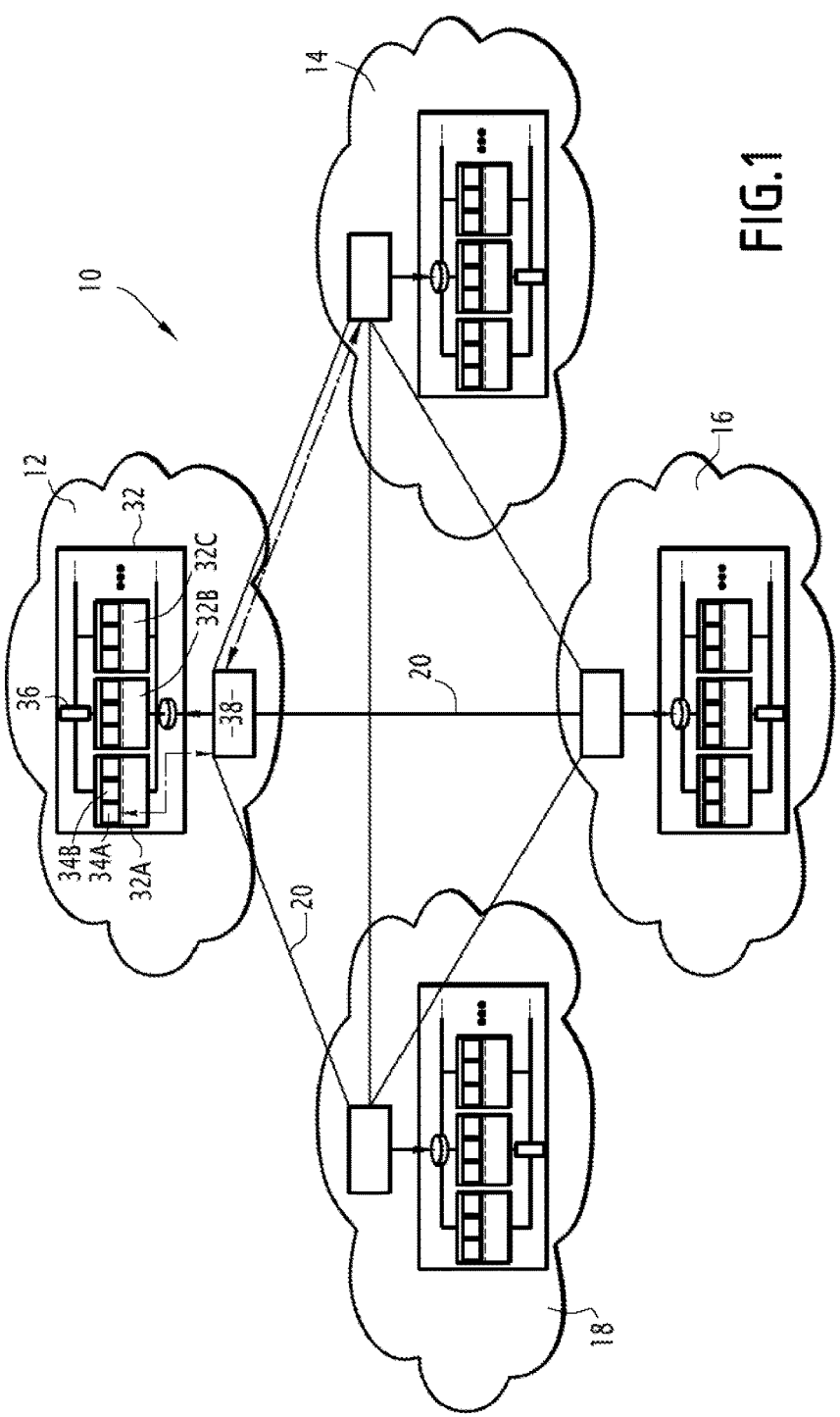
FIG. 1 is a diagrammatic view of a network according to the invention.

The network shown in FIG. 1 is a computer network 10, for example designed for military or civilian operations deployed in a wide scale operations theater. This operations theater is for example an area affected by an earthquake.

The network 10 includes several computer processing sites 12, 14, 16, 18 that are interconnected with one another by data transmission links 20. The sites are capable of implementing services offered to all of the users present on the network. The services are for example a service providing maps of the region, an operations planning service, a telecommunications management service, or any other service making it possible to facilitate the operations.

At a given moment, each service is implemented on a single site of the network. According to the invention, the services are capable of being transferred from one site to another site following a predetermined set of rules.

Each service is made up of a set of processing or communication programs, configuration parameters, as well as data on which the service works.

The links 20 are capable of enabling access from any point of the network to each of the sites to access the services present as a function of predetermined access rules. Furthermore, the links are capable of transferring programs, parameters and data making up each of the services between two network sites.

The computer sites are remote and independent of one another, such that they can be characterized by unique levels of physical and logic risk. The physical and logic risk level of each site is for example described by an integer comprised between 1 and 10 representing the likelihood of the site being destroyed or inoperative following a physical attack such as a bomb, a mudslide, or a hurricane, or following a computer attack such as a virus or destruction or disorganization actions with respect to primary computer programs. Out of convention, the higher the likelihood of destruction of the site, the lower the value of the level of physical and logic risk.

In the considered embodiment, each computer site includes a server farm 32 including several servers 32A, 32B, 32C each housing several virtual machines 34A, 34B.

Each virtual machine 34A, 34B is capable of implementing a single specific service used by the network.

The server farm 32 is associated with a storage unit 36 specific to the considered site, such as a hard drive bay. Lastly, each site includes a supervision unit 38 specific to the site, said unit also being called the manager. Said supervision unit is capable of managing the server farm, creating and using virtual machines that are hosted, as well as providing two-way transfers of information to and from the considered site.

To that end, all of the communications provided by the links 20 entering or leaving a given site are done through the supervision unit 38 of the site.

Each computer site 12 to 18 is associated with security characteristics stored in the supervision unit 38 for the site. The security characteristics are parameters defining the risk status and the capacities of the site. These characteristics include, aside from the level N of physical and logic risk already mentioned, the available resources R and the quality Q of network access to that site, for example.

Furthermore, each service operating on the network is associated with unique protection parameters defining the measures automatically taken to ensure sufficient preservation of the service on the network. The security attributes are for example the criticality level C of the service, the minimum transfer frequency Fm of the service, the maximum transfer frequency FM of the service, the acceptable risk level NA for the service, and a transfer time range [T1, T2] for the service.

The supervision units 38 for the sites are capable of collectively implementing the service management method according to the invention.

To that end, the supervision units 38 are each capable of commanding that a service hosted on the server farm be kept on the considered site or commanding the transfer thereof to another site when certain predetermined conditions are met.

Likewise, each supervision unit 38 is capable of mobilizing the resources necessary to receive the service transferred to it from another site and to host and run it.

To that end, the supervision units 38 include means for exchanging information on the services operating on each of the sites, and the other security characteristics of each of the sites, and in particular the resources R that are currently available on the site as well as the physical and logic risk level N of the site.

FIG. 2 shows the algorithm for the implemented service management method.

This algorithm is capable of transferring each service from an initial site to a destination site of the network following a predefined sequence unique to the service that is independent of the sole responsibility of the or each site. This sequence specific to each service is stored in the parameters of the service and transmitted with the service.

According to a first embodiment, the predetermined transfer sequence for a given service is defined by a given fixed transfer frequency. Thus, for example, this frequency leads to a periodic transfer with a period equal to one week.

In step 100, the service is considered to operate on an initial host site. In order to ensure hosting thereof, the supervision unit 38 creates, for installation of the service, a virtual machine on which the service is implemented, launches the service, and simultaneously initiates a countdown.

The expiration of the countdown is verified in step 102. As long as the countdown has not expired, the service continues to be implemented on the initial site.

Upon expiration of the countdown, the supervision unit 38 for the initial site communicates with the other remote sites in order to obtain the security characteristics from the latter, and in particular the resources R currently available and the risk level N. These characteristics, denoted 106 in FIG. 2, are received by the supervision unit of the initial site.

In step 108, the supervision unit 38 of the initial site determines, from a predetermined rule, a set of potential sites that may host the service. This rule accounts for the security attributes specific to the service to be transferred and the security attributes of the other sites. For example, the selection rule is as defined below.

The sites are potential sites if:
the level of physical and logic risk N of the site is higher than the acceptable risk level NA for the service; and
the site resources R that are currently available are greater than or equal to those currently used by the service on the initial site.

In step 110, the supervision unit 38 of the initial site randomly determines the destination site chosen from among the potential destination sites.

In step 112, the supervision unit 38 of the initial site commands the supervision unit of the destination site to reserve the resources necessary for the service that needs to be transferred. After having obtained confirmation of the reservation of the resources and after stopped the service, the supervision unit 38 of the initial site sends the service and its security attributes to the supervision unit of the destination site in step 114.

The service is thus transferred in the form of an image from the virtual machine running the service to be protected denoted 116, and the security attributes denoted 118 are transferred at the same time.

In step 120, upon receipt of the service to be transferred, the supervision unit 38 of the destination site receives the service as well as the security attributes. The service is installed on a virtual machine specifically set up, and a countdown is again initiated in step 100.

One can see that with such a method applied to all of the services present on the network, the services re transferred, in particular randomly between the different sites, thereby making it difficult for an outside attacker to determine the site that must be destroyed to render the considered service inactive. The lack of redundancy in the operation of the service makes the implementation of the method relatively easy and requires only limited processing capacities.

The sequence of transfers for a given service has been described as being defined by a constant frequency. Alternatively, the sequence of transfers is pseudo-random. According to still another alternative, this sequence depends on the security characteristics of the sites and the security attributes of the service.

Thus, for example, the length of time during which the service is kept on a site is proportional to the quotient N/NA of the risk level N of the site hosting the service by the acceptable risk level NA of the service.

The implementation of the method being ensured by the supervision unit specific to each site, no shared manager for all of the sites for the services is used, thereby preventing a centralized manager from representing a risk due to the fact that its destruction would make the transfer of services impossible.

The fact that the services change sites deterministically as a function of a predetermined sequence makes it possible to ensure that each service is difficult to identify, thereby making it difficult to destroy the site hosting it.

The invention claimed is:

1. A method for managing services on a network, including
   at least two interconnected computer sites, each of which is capable of implementing at least one service accessible from the network; and
   a capability configured to transfer a service from an initial site to a separate destination site,
   wherein each of the computer sites includes a server farm including a plurality of servers, each of the servers hosting a plurality of virtual machines,
   wherein each of the virtual machines is configured to implement a single specific service,
   wherein each of the computer sites includes a site manager specific to the computer site, each of the site managers being configured to: manage the corresponding server farm, and create and use the virtual machines that are hosted on the corresponding server farm,
   wherein each of the computer sites is associated with security characteristics,
   wherein the method comprises:
   choosing potential destination sites as a function of the security characteristics of the computer sites making up the network;
   choosing the destination site among the potential destination sites as a function of a predefined rule, wherein the choosing the destination site includes a phase of randomly choosing among the network sites; and
   transferring at least one service from the initial site to the destination site of the network according to a predetermined transfer sequence, the predetermined transfer sequence depending on security attributes and being independent of a sole responsibility of each of the computer sites,
   wherein the security attributes include one or more parameters among a criticality level of the service, a minimum transfer frequency, a maximum transfer frequency, an acceptable risk level, and a transfer time range, and
   wherein the security characteristics include one or more of the characteristics among the available resources of the site, the physical and logic risk level of the site, and the quality of the network for accessing the site.

2. The method according to claim 1, wherein the transfer sequence depends on the security characteristics of the site on which the service is implemented.

3. A network including:
   at least two interconnected computer sites each capable of implementing a service accessible from the network,
   wherein each of the computer sites includes a server farm including a plurality of servers, each of the servers hosting a plurality of virtual machines,
   wherein each of the virtual machines is configured to implement a single specific service,
   wherein each of the computer sites includes a site manager specific to the computer site, each of the site managers being configured to: manage the corresponding server farm, create and use the virtual machines that are hosted on the corresponding server farm, and transfer a service from an initial site to a separate destination site,
   wherein each of the computer sites is associated with security characteristics,
   wherein each service is associated with security attributes, and
   wherein the site manager is capable of performing the transfer following a predetermined transfer sequence by implementing a service management method, the predetermined transfer sequence depending on the security attributes and being independent of a sole responsibility of each of the computer sites,
   wherein the service management method comprises:
   choosing potential destination sites as a function of the security characteristics of the computer sites making up the network;
   choosing the destination site among the potential destination sites as a function of a predefined rule, wherein the choosing the destination site includes a phase of randomly choosing among the network sites; and
   transferring at least one service from the initial site to the destination site of the network according to a predetermined transfer sequence, the predetermined transfer sequence depending on security attributes and being independent of a sole responsibility of each of the computer sites, wherein the security attributes include one or more parameters among a criticality level of the service, a minimum transfer frequency, a maximum transfer frequency, an acceptable risk level, and a transfer time range, and wherein the security characteristics include one or more of the characteristics among the available resources of the site, the physical and logic risk level of the site, and the quality of the network for accessing the site.

* * * * *